(12) United States Patent
Hessling et al.

(10) Patent No.: US 10,151,402 B2
(45) Date of Patent: Dec. 11, 2018

(54) PRESSURE CONTROLLED AND PRESSURE CONTROL VALVE FOR AN INFLATABLE OBJECT

(71) Applicant: Numatics, Incorporated, Novi, MI (US)

(72) Inventors: Terry John Hessling, Morrice, MI (US); Scott Andrew Menko, Linden, MI (US); Michael Paul Brown, Fenton, MI (US)

(73) Assignee: Asco, L.P., Novi, MI (US)

(*) Notice: Subject to any disclaimer, the term of this patent is extended or adjusted under 35 U.S.C. 154(b) by 109 days.

(21) Appl. No.: 15/108,991

(22) PCT Filed: Jan. 21, 2014

(86) PCT No.: PCT/US2014/012235
§ 371 (c)(1),
(2) Date: Jun. 29, 2016

(87) PCT Pub. No.: WO2015/112109
PCT Pub. Date: Jul. 30, 2015

(65) Prior Publication Data
US 2016/0327178 A1    Nov. 10, 2016

(51) Int. Cl.
*F16K 31/12* (2006.01)
*B60C 23/12* (2006.01)
(Continued)

(52) U.S. Cl.
CPC .......... *F16K 31/1264* (2013.01); *B60C 23/12* (2013.01); *B60C 29/002* (2013.01);
(Continued)

(58) Field of Classification Search
None
See application file for complete search history.

(56) References Cited

U.S. PATENT DOCUMENTS

| 1,730,305 A | 10/1929 | Stancu, Jr. |
| 3,276,503 A | 10/1966 | Kilmarx |
(Continued)

FOREIGN PATENT DOCUMENTS

| CN | 1903597 A | 1/2007 |
| CN | 202579476 U | 12/2012 |
(Continued)

OTHER PUBLICATIONS

European International Search Report; International Application No. 14880350.5; Filing Date Aug. 20, 2016; dated Aug. 2, 2017; 7 Pages.
(Continued)

*Primary Examiner* — Marina Tietjen
*Assistant Examiner* — Daphne M Barry
(74) *Attorney, Agent, or Firm* — Reising Ethington, P.C.

(57) ABSTRACT

A pressure controlled valve assembly has a housing with a pressure controlled valve moveable between an open and closed position with respect to a valve seat for controlling communication between a pneumatic supply and a pneumatic pressure control source. The housing also has first and second passageways with a pair of check valves in each passageway. Each passageway is connectable to a reversible pump such that when the pump operates in one direction one pair of check valves allow flow while the other pair of check valves prevents backflow.

16 Claims, 11 Drawing Sheets

(51) Int. Cl.
*B60C 29/00* (2006.01)
*F16K 15/14* (2006.01)
*F16K 15/20* (2006.01)
*F16K 31/126* (2006.01)

(52) U.S. Cl.
CPC .......... *F16K 15/141* (2013.01); *F16K 15/147* (2013.01); *F16K 15/20* (2013.01)

(56) References Cited

U.S. PATENT DOCUMENTS

| | | | |
|---|---|---|---|
| 3,730,217 A * | 5/1973 | Gute | B60S 1/48 137/102 |
| 3,844,529 A | 10/1974 | Brandt, Jr. et al. | |
| 3,895,645 A | 7/1975 | Johnson | |
| 3,945,302 A | 3/1976 | Downs | |
| 4,044,732 A | 8/1977 | Inada et al. | |
| 4,130,267 A | 12/1978 | Inada et al. | |
| 4,151,819 A | 5/1979 | Inada et al. | |
| 4,180,096 A | 12/1979 | Johnson | |
| 4,207,884 A | 6/1980 | Isaacson | |
| 4,346,836 A | 8/1982 | Nagel | |
| 4,364,410 A | 12/1982 | Chow | |
| 4,574,826 A | 3/1986 | Johnson | |
| 4,583,522 A | 4/1986 | Aronne | |
| 4,596,360 A | 6/1986 | Cohen | |
| 4,634,109 A | 1/1987 | Cigolotti et al. | |
| 4,712,580 A | 12/1987 | Gilman et al. | |
| 4,895,199 A | 1/1990 | Magnuson et al. | |
| 4,944,276 A | 7/1990 | House et al. | |
| 5,188,337 A | 2/1993 | Mertens et al. | |
| 5,423,342 A | 6/1995 | Fenner, Jr. | |
| 5,447,174 A | 9/1995 | Bourkel et al. | |
| 5,544,688 A | 8/1996 | Freigang et al. | |
| 5,630,935 A | 5/1997 | Treu | |
| 5,807,358 A | 9/1998 | Herweck et al. | |
| 5,807,445 A * | 9/1998 | Hoffmann | B60C 23/007 152/415 |
| 5,845,675 A | 12/1998 | Ligh | |
| 5,957,151 A | 9/1999 | Dalcourt et al. | |
| 6,042,081 A | 3/2000 | Anderson | |
| 6,227,520 B1 | 5/2001 | Huber, Jr. | |
| 6,401,743 B1 | 6/2002 | Naedler | |
| 6,427,714 B2 | 8/2002 | Friegang et al. | |
| 7,114,518 B2 | 10/2006 | Kirby | |
| 7,422,612 B2 | 9/2008 | Pietschner | |
| 7,717,682 B2 | 5/2010 | Orr | |
| 7,766,028 B2 | 8/2010 | Massengale et al. | |
| 7,878,479 B2 | 2/2011 | Yamamoto | |
| 7,950,621 B2 | 5/2011 | Meinig et al. | |
| 7,975,715 B2 | 7/2011 | Ramler et al. | |
| 7,988,130 B2 | 8/2011 | Ohmi et al. | |
| 8,042,586 B2 | 10/2011 | Losey et al. | |
| 8,113,254 B2 | 2/2012 | Benedict | |
| 8,235,081 B2 | 8/2012 | Delgado et al. | |
| 8,322,036 B2 | 12/2012 | Delgado et al. | |
| 8,381,784 B2 | 2/2013 | Delgado | |
| 8,381,785 B2 * | 2/2013 | Losey | B60C 23/12 152/415 |
| 9,327,560 B2 | 5/2016 | Hinque | |
| 2004/0060597 A1 | 4/2004 | Boulicault | |
| 2008/0142091 A1 | 6/2008 | Menig et al. | |
| 2009/0095359 A1 | 4/2009 | Campau | |
| 2010/0147387 A1 | 6/2010 | Medley et al. | |
| 2011/0225961 A1 | 9/2011 | McCrary | |
| 2012/0073716 A1 * | 3/2012 | Benedict | B60C 23/12 152/429 |
| 2013/0092250 A1 | 4/2013 | Spielvogel et al. | |
| 2014/0020805 A1 * | 1/2014 | Gobinath | B60C 23/12 152/450 |
| 2015/0210127 A1 * | 7/2015 | Krempel | B60C 23/12 152/512 |

FOREIGN PATENT DOCUMENTS

| | | |
|---|---|---|
| CN | 202884140 | 4/2013 |
| DE | 200 16 214 U1 | 2/2002 |
| EP | 2565059 A2 | 3/2013 |
| JP | 2002 081402 A | 3/2002 |
| WO | WO 2004/088445 A1 | 10/2004 |
| WO | WO 2012/142120 A2 | 10/2012 |
| WO | WO 2013/089694 A1 | 6/2013 |

OTHER PUBLICATIONS

PCT International Search Report and Written Opinion, PCT Application No. PCT/US2014/012235, Filing Date: Jan. 21, 2014, 7 pages.

International Preliminary Report on Patentability, International Application No. PCT/US2014/012235, Filing Date: Jan. 21, 2014, 6 pages.

* cited by examiner

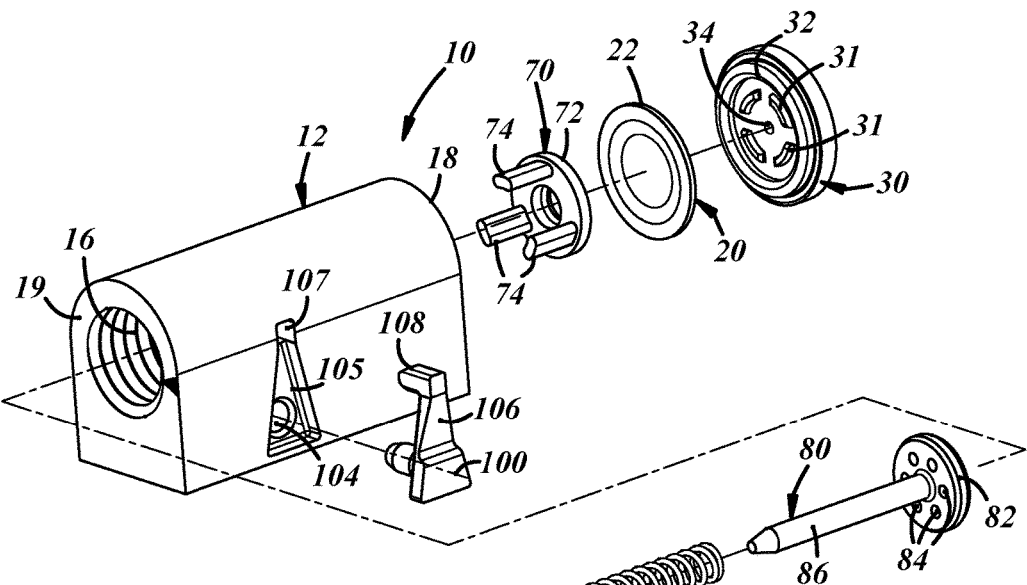
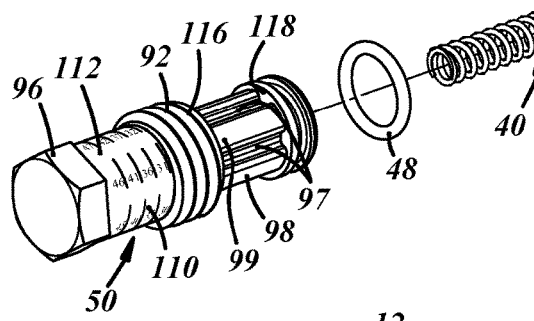
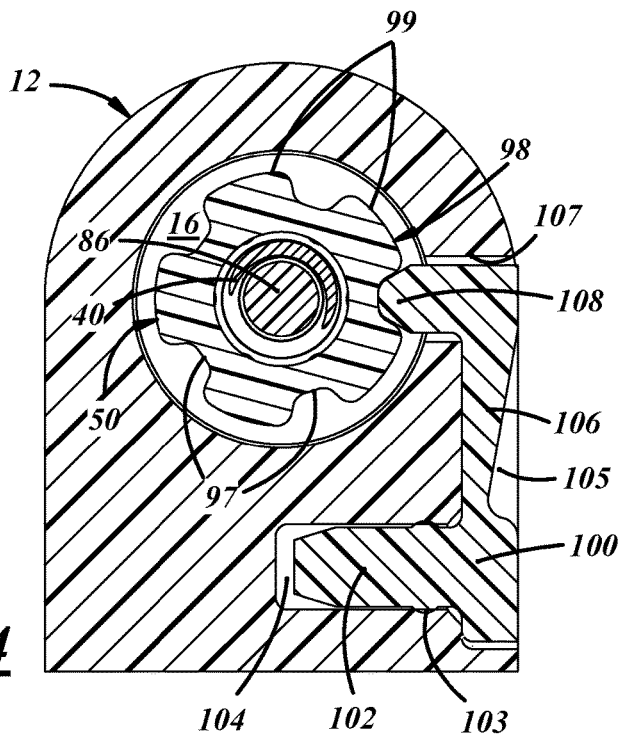
FIG. 3
FIG. 4

PRESSURE CONTROLLED AND PRESSURE CONTROL VALVE FOR AN INFLATABLE OBJECT

TECHNICAL FIELD

The field of this invention relates to a pressure controlled and pressure control valve and more particularly to a pressure controlled valve suitable for self-inflatable devices.

BACKGROUND OF THE DISCLOSURE

Pressure controlled and pressure control valves have wide applications. There are a few that are suitable for maintaining a set pressure for a pneumatic article for example, a pneumatic tire, pneumatic bed, and pressurized tanks. Many of these are diaphragm valves that only use the diaphragm as an actuator but another element, for example a poppet valve is used as the on/off valve.

There are situations where the pressure control valve set pressure needs to be easily changed according to different applications and which can be easily set by a manufacture or a service facility. Furthermore, it is desired to deter the end user from changing the set pressure.

On the other hand, there are situations where it is desired to have the pressure controlled valve easily adjustable by the end user. One situation example is for self inflatable pneumatic tires. Tire companies make the same tire for a variety of makes and models of motor vehicles and the manufacturer of each make and model has its preferred set pressure. While adjustable regulators or pressure controlled valves are known, they are constructed in a fashion that prevents usage for self-inflatable objects.

It is highly desired to have a pressure controlled valve that can be easily adjusted from the exterior of the valve housing to accommodate the different pneumatic pressures to eliminate the need to replace a valve regulator for each make and model.

What is also needed is a pressure controlled valve that is economical to build and is easily adjustable from its exterior to accommodate different pneumatic pressures for use in a self-inflatable object. What is also needed is a valve that is also used as a pressure actuator to reduce the number of parts and provide for a more economical valve. What is also needed is a pressure controlled valve that is suitable for use with different fluids. What is also desirable is a pressure controlled valve that can be easily pre-set to one of a variety of set pressures depending on the application at the manufacturing or assembly facility but deters the end user from undesirably and inadvertently adjusting the set pressure.

SUMMARY OF THE DISCLOSURE

In accordance with one aspect of the invention, an adjustable pressure controlled valve has a housing with a first bore. An inlet passage and outlet passage respectively lead to and from the bore in the housing. The housing has a valve seat operably interposed between the inlet passage and outlet passage.

A valve member is mounted in the first bore and has a valve surface for seating on the valve seat when in a closed position and movable from the valve seat to an open position. The valve member has an opposite surface that is operably in communication with a pneumatic pressure for producing a closing force on the valve member. A resilient biasing member is mounted in the housing for exerting a opening biasing force on the valve member. An adjustment member is adjustably connected to the housing for adjusting the opening biasing force of the resilient biasing member.

Preferably, the resilient biasing member is in the form of a helical compression spring mounted in a second bore of the housing. The spring is adjustably compressed between the valve member and the adjustment member.

The second bore has threads and the adjustment member is threadably engaged with the threads of the second bore for axial and rotational adjustment. The adjustment member is accessible for adjustment from an exterior of the housing.

In one embodiment, the valve member is a diaphragm valve that is flexible with its periphery fixedly mounted in the first bore and held in position by a cap member. The cap member has a vent therethrough for communication with a pressure source that exerts a closing biasing force on the diaphragm valve.

In accordance with another aspect of the invention, a pressure controlled valve has a housing with a pressure chamber for communication with a pneumatically pressurized control source. The housing has an inlet for communication with a pneumatic supply source and an outlet selectively in fluid flow with the inlet and a valve seat. A movable valve is constructed to open and close with respect to the valve seat to selectively open a pathway from the inlet to the outlet and close the pathway between the inlet and outlet. The pressure chamber is sealingly and fluidly separated in the housing from the pathway between the inlet and outlet. The movable valve is constructed to respond to a closing biasing force caused by pneumatic pressure within the pressure chamber. A resilient spring is mounted in the housing to provide an opening biasing force on the movable valve. Preferably, the resilient spring is adjustable to provide an adjustable opening biasing force on the movable valve.

In one embodiment, the first bore and second bore are co-aligned with the valve seat interposed therebetween. The resilient spring is a helical compression spring seated on a lift rod member. The lift rod member is abuttingly connected to a valve lifter member that directly abuts the diaphragm valve. One of the lift rod member and valve lifter member has at least one prong axially extending through at least one passage between the first and second bores.

In accordance with another aspect of the invention, a pressure controlled valve has a housing with a first pressure chamber for communication with a pneumatically pressurized control source. The housing has an inlet for communication with a pneumatic supply source and an outlet selectively in fluid flow with the inlet. A movable valve opens and closes with respect to a valve seat of the housing to selectively open a pathway from the inlet to the outlet and close the pathway between the inlet and outlet. The pressure chamber is sealingly and fluidly separated from the pathway between the inlet and outlet. The movable valve is constructed to respond to a closing biasing force of predetermined amount caused by pneumatic pressure within the pressure chamber. A resilient spring mounted in the housing provides an opening biasing force on the movable valve.

Preferably, the resilient spring is adjustable to provide an adjustable opening biasing force on the movable valve. In one embodiment, the movable valve is a diaphragm valve that is flexible with its periphery sealingly affixed in the housing. The diaphragm valve and the spring are co-aligned within the housing. In another embodiment, the movable valve is a piston type valve slidably mounted in the housing.

In accordance with another aspect of the invention, an adjustable pressure controlled valve has a housing with a valve seat and passage extending from an inlet to an outlet. A valve member is movable between an open position and a closed position with respect to the valve seat with one side of the valve member selectively seated on the valve seat when in the closed position. The housing has a pressure chamber on an opposite side of the valve member for exerting a closing bias on the valve member. An adjustable resilient spring member is in the housing and exerts an opening bias on the valve member. An adjustment member is axially movable relative to the housing by rotation with respect to the housing to adjust the amount of opening bias exerted by the adjustable resilient spring member on the valve member. The adjustment member has circumferentially spaced grooves about a central axis and axially spaced shoulders at each end of the grooves. A spring detent clip is selectively engageable to one of the grooves to reduce the risk of inadvertent rotation of the adjustment member. The spring detent is also engageable with the axially spaced shoulders to define the range of axial motion of the adjustment member.

According to another aspect, a pressure controlled valve assembly has a housing with a pressure controlled valve housed therein that is controlled between an open position and closed position by a pressure control chamber in the housing for controlling communication of a pneumatic supply source through an inlet with a pneumatic pressure control source through an outlet. The pneumatic pressure control source is in communication with a pressurizable device to provide feedback through the pressure control chamber to control pressure in the pressurizable device. The housing has a first passageway and a second passageway interposed between the pressure controlled valve and the outlet. The first passageway and the second passageway have respective first and second ports in the housing connectable to a respective first end and second end of a reversible pump.

A first pair of check valves is in the first passageway of the housing and a second pair of check valves is in the second passageway of the housing. When the reversible pump operates in one direction and the pressure controlled valve is in the open position, one downstream check valve of the first pair enables high pressure from the reversible pump to flow through a respective port to the outlet and in the upstream check valve of the first pair enables lower pressure flow from the pressure controlled valve to the reversible pump. When the reversible pump operates in the opposite direction and the pressure controlled valve is in the open position, a downstream check valve of the second pair enables high pressure from the reversible pump to flow through a respective port to the outlet and an upstream check valve of the second pair enables lower pressure flow from the pressure controlled valve to the reversible pump.

Preferably, the housing has a pressure controlled valve mounting section and a second housing section. The second housing section has first and second ends. The first end is mounted to the pressure controlled valve housing section. The first and second passageways each have two path legs passing through the second housing section from the first end to the second end. The first pair and second pair of check valves are positioned at respective first ends of the two path legs at each first and second passageway.

In one embodiment, the check valves have a mounting rim seated in a respective counterbore at respective first ends of the two path legs for the first and second passageways. The first and second pairs of check valves are preferably duck bill type check valves.

In one embodiment, the second housing section has a third path leg for each passageway for providing return flow from the reversible pump to the first end of the second housing section and selectively provides high pressure flow through the downstream check valve for each pair of check valves.

Preferably, a port adapter plate is interposed between the pressure controlled valve mounting section and the second housing section. The mounting rims of the check valve have ends sealingly abutting the port adapter plate for directing flow from the port adapter plate and through the second housing section. Furthermore, in one embodiment, the second housing section has the inlet passing therethough to the pressure controlled valve mounting section.

According to another aspect of the invention, an adjustable pressure controlled valve has a housing with a cavity therein. An inlet passage leads to the cavity and an outlet passage leads from the cavity. The housing has a valve seat interposed between the inlet passage and outlet passage. A valve member is mounted in the cavity and is operably interposed between the inlet passage and the outlet passage of the housing. The valve member has a valve surface for seating on the valve seat when in a closed position and movable from the valve seat to an open position. A first resilient biasing member is mounted in the housing for exerting an opening bias force on the valve member to move the valve member to the open position. A second resilient biasing member mounted on an opposite side of the valve member for exerting a closing bias force on the valve member to move the valve member to the closed position. The closing bias force from the second resilient member is less than the opening bias force the first resilient member.

A cap member is inserted in the bore a pre-set axial amount to seat and pre-compress the second resilient member a pre-set amount between the cap member and the valve member and affixing the cap member in place such that the closing bias force of the second resilient biasing member is adjustably pre-set by the cap member. The valve member is also biased to the closed position by a pneumatic pressure control source and, when pneumatic pressure in the pneumatic pressure control source is over a pre-determined amount, its closing bias force in addition to the closing bias force of the second resilient member overcomes the opening bias force of the first resilient member to close the valve member.

BRIEF DESCRIPTION OF THE DRAWINGS

Reference now is made to the accompanying drawings in which:

FIG. 3 is an exploded perspective view of the valve shown in FIG. 1;

FIG. 4 is a cross-sectional view taken along lines 4-4 shown in FIG. 1;

DETAILED DESCRIPTION OF THE PREFERRED EMBODIMENT

Figure 1:
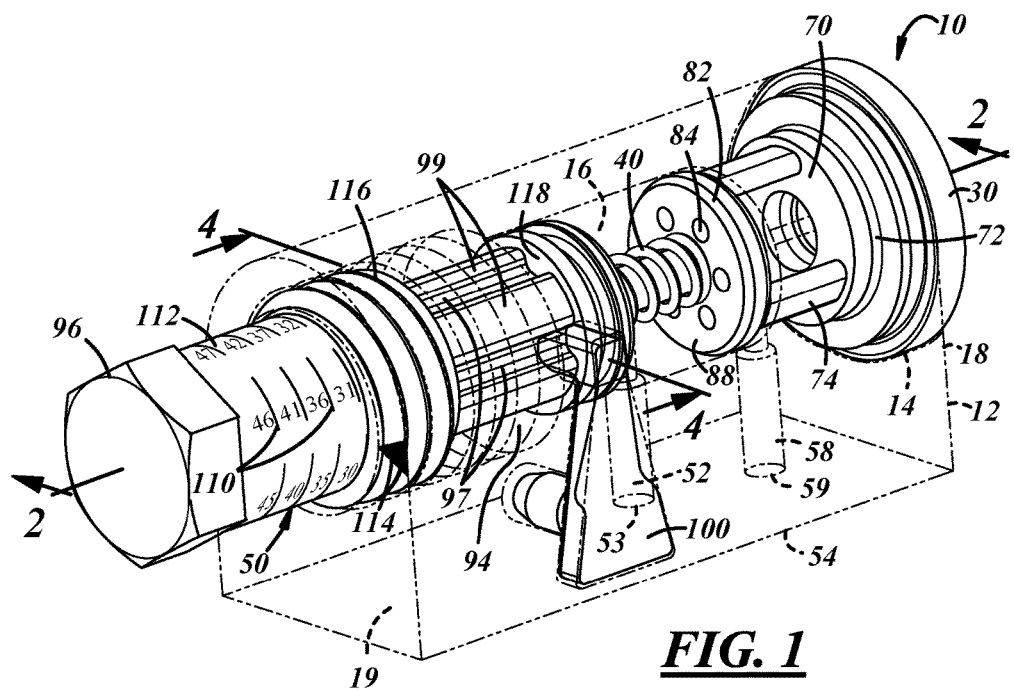
FIG. 1 is a perspective transparent view of one embodiment of a pressure controlled valve with the valve housing being transparent to illustrate its internally mounted parts and the adjuster set at about 30 PSI.
Figure 2:
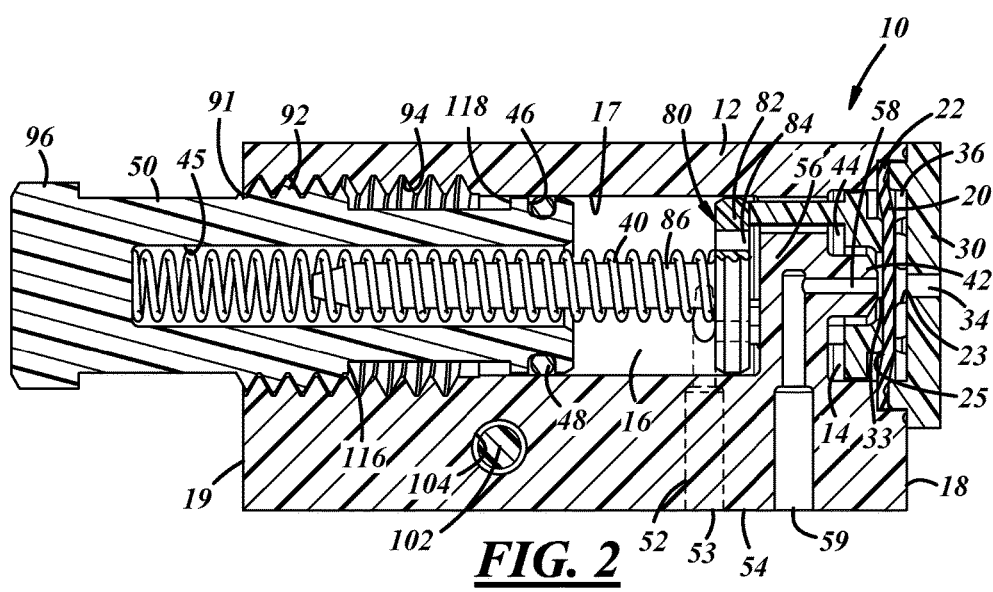
FIG. 2 is a cross-sectional view taken along the lines 2-2 shown in FIG. 1 illustrating the valve in an open position.

Referring now to FIGS. 1, 2 and 3, a valve 10 has a housing 12 with a first bore 14 and a second bore 16 at opposite ends 18 and 19 of housing 12. The first and second bores are co-aligned. A flexible diaphragm valve 20 is fitted in the first bore 14 and sealingly clamped in place by a cap member 30 secured to housing 12. The second bore 16 receives a resilient helical spring 40 operably biased to move the diaphragm valve 20 away from valve seating surface 42 and is adjustably compressed by adjustment member 50 threadably engaged to the second bore 16 of the housing. The bores 14 and 16, spring 40, adjustment member 50, diaphragm valve 20 and caps 30 are all co-aligned in housing 12. A retaining clip 100 is mounted to the exterior of housing to retain the adjustment member 50 in the second bore 16 and to secure it against inadvertent rotation.

Figure 5:
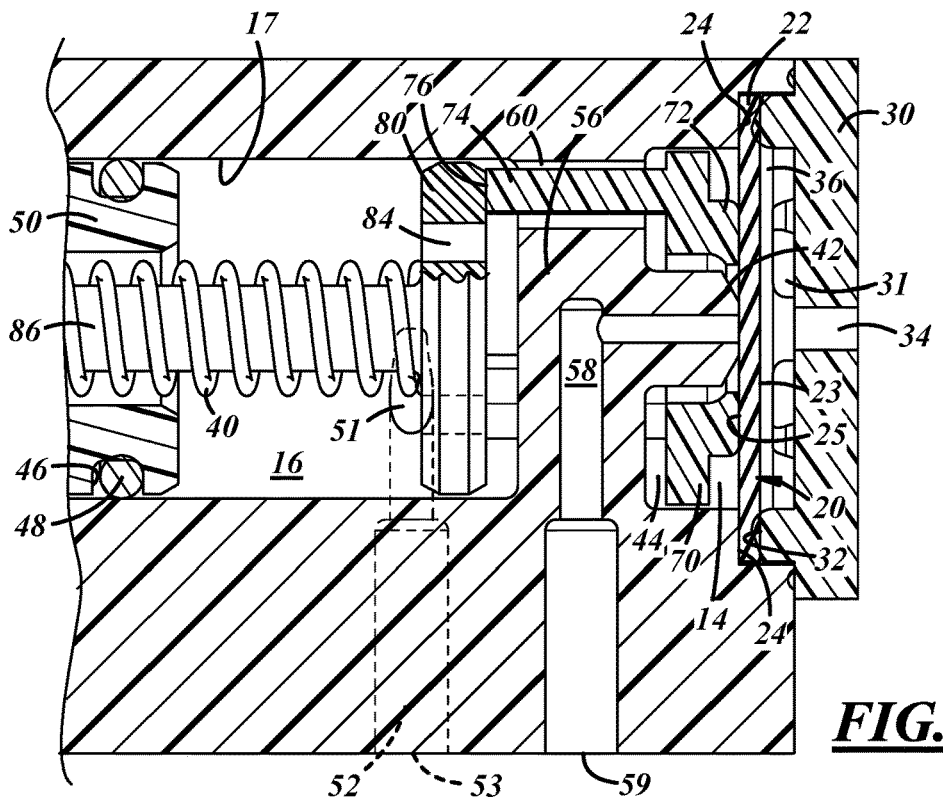
FIG. 5 is an enlarged fragmented side segmented view showing the valve in a closed position.

More particularly, as shown in FIGS. 2 and 5, the diaphragm valve 20 has a first pressure surface 23 and opposite facing second valve surface 25 and has its periphery 22 clamped in the first bore 14 between a shoulder 24 of housing and a shoulder 32 of cap member 30. The cap member 30 and diaphragm valve 20 form a pressure chamber 36 with housing 12 in first bore 14. The chamber 36 can be in fluid and pressure communication with a suitable pressurized pneumatic source (not shown) via a vent 34 through cap 30. The shown pneumatic source may be, for example, an interior of tire, interior of a pneumatic bed, pressure tank or other pressurized item.

The housing 12 has an inlet 53 leading to passage 52 from an exterior side wall 54 of the housing into the second bore 16 at downstream end 51. The inlet 53 can be in communication with a pneumatic source for example, ambient atmosphere.

The first and second bores 14 and 16 are separated from each other by a divider section 56 of housing 12 which provides the valve seating surface 42 thereon. The valve seating surface 42 surrounds an outlet passage 58 which has its downstream end 59 connectable to a pump (not shown) which then can lead to an item being pressurized, e.g. the interior of a pneumatic tire, a pneumatic bed, pressure tank or other inflatable or pressurizable item. The first bore 14 has an annular chamber section 44 surrounding the valve seating surface 42.

Figure 6:
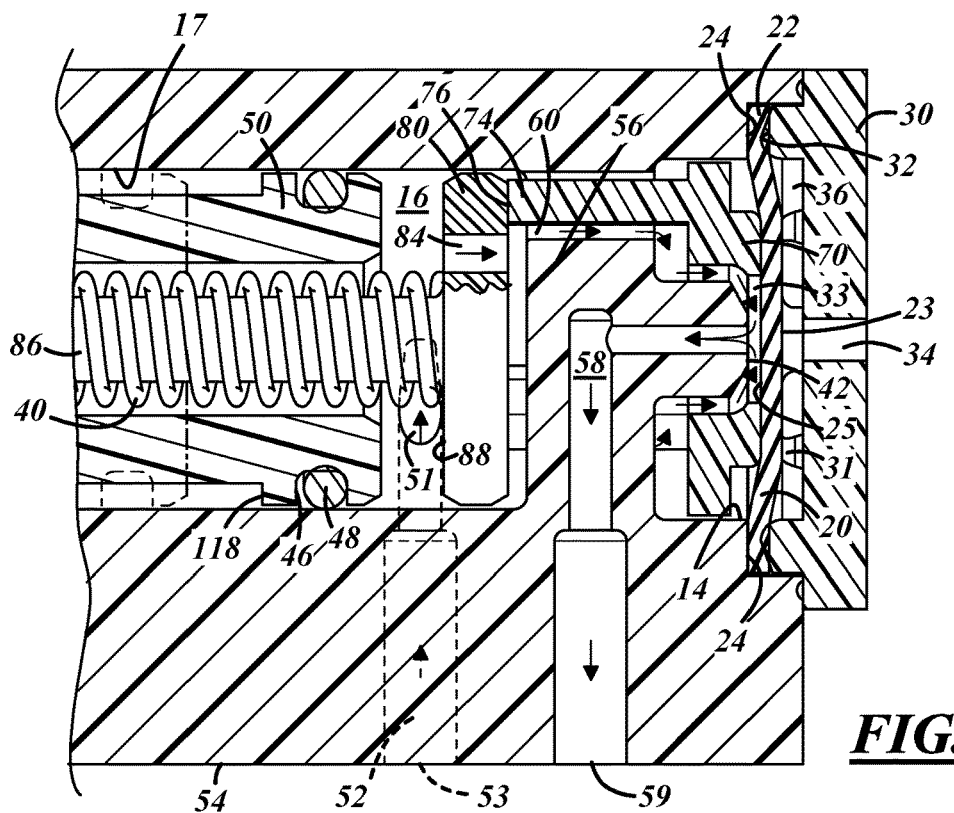
FIG. 6 is a view similar to FIG. 5 showing the adjustment member adjusted to a higher set pressure e.g. 50 PSI compared to the lower set pressure shown in phantom and the valve being in the open position.

The inlet passage 52 and outlet passage 58, when the diaphragm valve 20 is in the open position as shown in FIG. 2 or 6, are in communication with each other through three passages 60 through divider 56 of which one passage 60 is clearly illustrated for simplicity of the drawings. The passages 60 are circumferentially spaced about divider 56 and provide for free pneumatic flow between the first and second bores 14 and 16.

Furthermore, a valve lifter member 70 has an annular shaped end 72 sifting in annular section 44 about valve section surface 42 and abuts the diaphragm surface 25. The lifter member 70 has three prongs 74 that extend through the passages 60 in a sliding manner and are dimensioned to leave room for pneumatic flow through the passages 60. The prongs 74 have their respective distal ends 76 abut a lift rod member 80. The lift rod member 80 has a disc section 82 and a spring post 86. To prevent vacuum and pressure lock, the disc section 82 has apertures 84 therethrough. The helical spring 40 surrounds a spring post 86 of lift rod member 80 and sits against the back surface 88 of the disc section 82.

The adjustment member 50 has an inner hole 45 that receives both the post 86 and spring 40. The inner hole 45 also seats the distal end of the spring 40. The adjustment member 50 near its inner end also has a groove 46 that seats a gasket 48 to allow the adjustment member 50 to slidably and sealingly engage the inner wall 17 of second bore 16 to prevent pneumatic leakage out rear threaded end 91 of housing 12. The adjustment member 50 has threads 92 that engage complementary housing threads 94 at rear end section 91 of inner wall 17 about the second bore 16. The adjustment member 50 has an enlarged head 96 that is constructed to be manually engaged for rotation to adjust the compression of the spring 40. The head 96 may be hex shaped as illustrated to be engaged by a wrench. It may in addition or alternately have an outer knurl to be manually grabbed, have a slot or Phillips screwdriver slot to be engaged by a screwdriver or Phillips head screw driver or have an internal hex to be engaged with a hex key wrench to facilitate manual rotation of the adjustment member.

As best shown in FIGS. 1, 3 and 4, besides the threads 92, axially and rotational motion of the adjustment member 50 is controlled by its splined section 98 with a number of circumferentially spaced grooves 97 and ribs 99 axially extending between shoulders 116 and 118 and engaging the clip 100. The clip 100 has a mounting peg 102 securely mounted in hole 104 of housing 12 through a tight press fit with circumferential protuberance 103 of peg 102 engaging hole 104. The clip has a flexible arm 106 seated in a recess 105 in housing 12 with a distal tapered tip 108 that extends through opening 107 and that is biased radially inward to engage one of the grooves 97 to act as a detent. The arm 106 can flex to allow the tip to move radially outward to disengage out of groove 97.

Calibrated pressure indicia 110 may be laser etched onto the outer side wall 112 of the adjustment member between the threads 92 and enlarged head 96. The indicia may be etched along a helical curve such that the set pressure is always at a fixed rotated angle with respect to the housing. The calibrated indicia 110 that is set is positioned axially directly at the end 19 of the housing 12 and can be calibrated to be radially positioned in proximity to an indicator arrow 114.

In operation, the adjustment member 50 is manually rotated such that the threads 92, 94 axially move the adjustment member to the desired axial position to compress the spring 40 which corresponds to a set pressure for example 30 PSI as shown in FIG. 1. As the adjustment member 50 is turned, the ribs 99 engage and push out the distal tip 108 of clip 100 from a groove 97 and the tip 108 then clicks back into a sequential groove 97. Each click corresponds to a change of a specified pressure difference, e.g. one PSI, in other words, a full rotation of the adjustment member corresponds to the specified pressure difference times the number of grooves 97 and it increases or decreases depending on the direction. For typical applications, the PSI indicia may range from 30 to 50 PSI. A typical range may provide for about four full rotations or a range of 20 PSI. FIGS. 1, 2 and 5 illustrate the adjustment member set at approximately the typical minimum adjusted set pressure, e.g. 30 PSI and FIG. 6 illustrates the adjustment member set at the typical maximum adjusted set pressure, e.g. 50 PSI.

Not only may an operator hear the click as the adjustment member 50 is rotated, but in noisy environments such as an active commercial garage, the operator may feel the clicks through the wrench and even place his finger on the spring arm 106 and feel the arm move radially in and out to keep track of the clicks and thereby the PSI adjustment. Once set, the tip 108 stays in the groove to act as a detent and serves to prevent inadvertent rotation of the adjustment member.

As best shown in FIGS. 1 and 3, the clip 100 also functions as a stop by having tip 108 abutting internal shoulders 116 and 118 at the opposite ends of the splined section 98 to prevent excessive rotation or axial motion of the adjustment member too far outward to disengage from threads 94 and too far inward which may otherwise permanently deform spring 40 beyond it resilient range.

If pressure in chamber 36 is less than the set pressure as indicated by the adjustment member, the resilient spring 40 biases the lift rod member 80 and pushes the valve lifter 70 to unseat the diaphragm valve 20 from valve seat surface 42 until the diaphragm abuts stops 31 on cap 30 creating open pathway passage 33 between inlet 53 and outlet 59. At this position, the valve is opened as illustrated in FIG. 2 or FIG. 6. This allows the pump (not shown) to pump air from atmosphere that flows from inlet 59 through the valve through open pathway 33 and to outlet passage 58 and then to the pump and into the interior air of the pneumatic inflatable bed, tire, pressure tank or other inflatable or pressurizable object.

Referring now to FIG. 5, if the pressure in chamber 36 is equal to or more than the set pressure as indicated by the adjustment member, the pressure in chamber 36 acts on diaphragm valve 20 and overcomes the bias of the resilient spring 40 and pushes against the lift rod member 80 and pushes the valve lifter 70 to compress the helical spring 40 until the diaphragm valve 20 becomes seated onto valve seat surface 42 which closes the valve by interrupting or closing pathway 33. The pump (not shown) may continue to operate but, intake passage 58 is closed, so the pump will not draw any fluid.

FIG. 6 illustrates the adjustment member 50 screwed down to higher set pressure position e.g. 50 PSI which further compresses spring 40 which therefore exerts great opening pressure through valve lifter 70 onto diaphragm valve 20. At this position, it takes greater pressure e.g. 50 PSI within chamber 36 to overcome the opening bias of spring 40 to close diaphragm 20 onto valve surface 42 as compared to the 30 PSI position shown in phantom.

In operation, pneumatic flow within housing 12 from inlet 53 through valve seat 42 and out to outlet 59 does not mix with and is completely separated from pressure chamber 36. Because of the separation of the pressure chamber 36 from passages 52, 58 and 60, the valve is suitable to be used where the pneumatic supply source may be different than the pneumatically pressurized control source, i.e. the gas in chamber 36. One pneumatic source is used as the pressure controlling source e.g. the pneumatic fluid in chamber 36, and one pneumatic supply system has controlled flow from inlet 52 to outlet 59.

On the other hand, when outlet 59 of the valve leads through a pump to an inflatable device for example a pneumatic tire, pneumatic bed or pressure tank, which is in fluid communication with chamber 36, the pressure controlled valve provides feedback through chamber 36 to control the pressure in the inflatable device.

Figure 7:
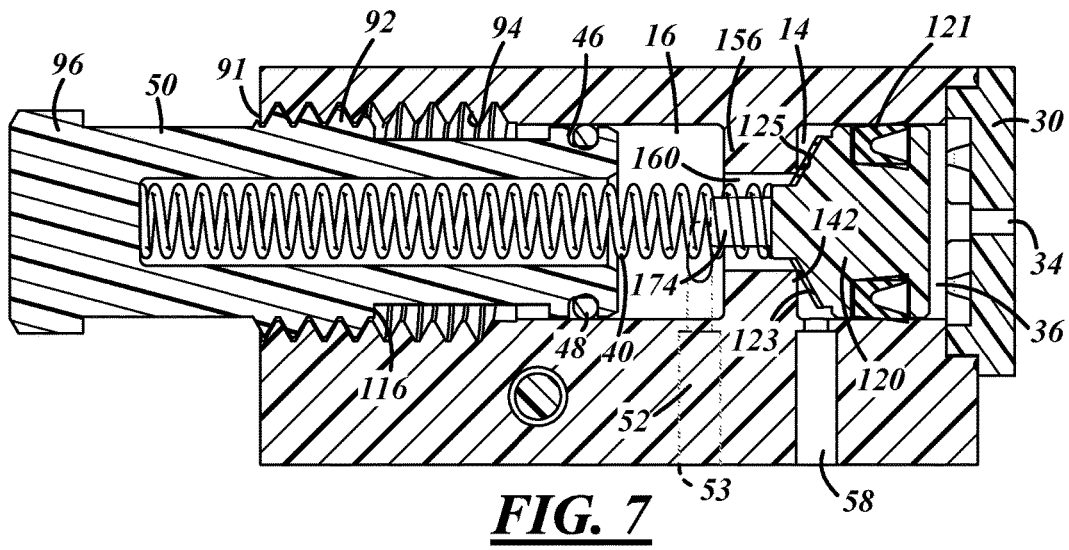
FIG. 7 is a segmented view similar to FIG. 2 showing an alternate embodiment.

Referring now to FIG. 7, an alternate embodiment is disclosed. Unchanged or substantially similar parts will bear the same numerals as mentioned before. In this embodiment, the diaphragm valve 20, valve lifter member 70 and lift rod member have all been replaced by slidable piston valve 120 that is slidably and sealably mounted in the first bore 14. The slidable piston valve 120 has an annular sealing gasket 121 to provide the sliding seal.

The slidable piston valve 120 has a frusto-conical shaped valve surface 123 that has an elastomeric overmold section 125 thereon. A divider section 156 has a single central passage 160 with an annular valve seat 142 thereabout. Outlet passage 58 extends from the first bore 14.

The slidable piston valve has a central leg 174 that extends through the central passage 160. The leg 174 has a diameter sized smaller that the diameter of central passage 160 to allow pneumatic flow through passage 160 from the second bore 16 to the first bore 14. The leg 174 extends into the helical spring 40. The helical spring 40 directly biases the piston valve 120 to an open position.

The remaining parts are substantially the same as the parts described for the first embodiment and will not be described again.

In operation when sufficient pneumatic pressure is in pressure chamber 36, the slidable piston valve overcomes the opening bias of helical spring 40 to seat the frusto-conical valve surface 123 onto valve seat 142 and close off outlet passage 58 from inlet 53 and passage 52 as shown in FIG. 7.

When the pressure in chamber 36 drops to below the adjusted opening bias of helical spring 40, the helical spring 40 moves the piston valve to the open position and provides fluid communication from inlet 53 and passage 52 through passage 160 and to outlet passage 58.

Other variations of the various parts are foreseeable for this valve 10. For example, the prongs 74, instead of being integral with valve lifter 70, may be integral with valve lifter rod 80. Furthermore, the prongs 74 as part of valve lift rod member 80 may directly abut the diaphragm and be used to lift the diaphragm off the valve seat to the open position. The three prongs may also be replaced by a centrally located prong that has a flow passage therethrough rather than about it. The piston valve surface 123 may have other shapes for example, an annular disc shape. The helical spring may be replaced by other kinds of springs or resilient members for example, an elastomeric plug. The resilient member rather than being a compression member in the second bore may be a resilient tension member mounted in the pressure chamber that still biases the valve member to the open position.

Figure 8:
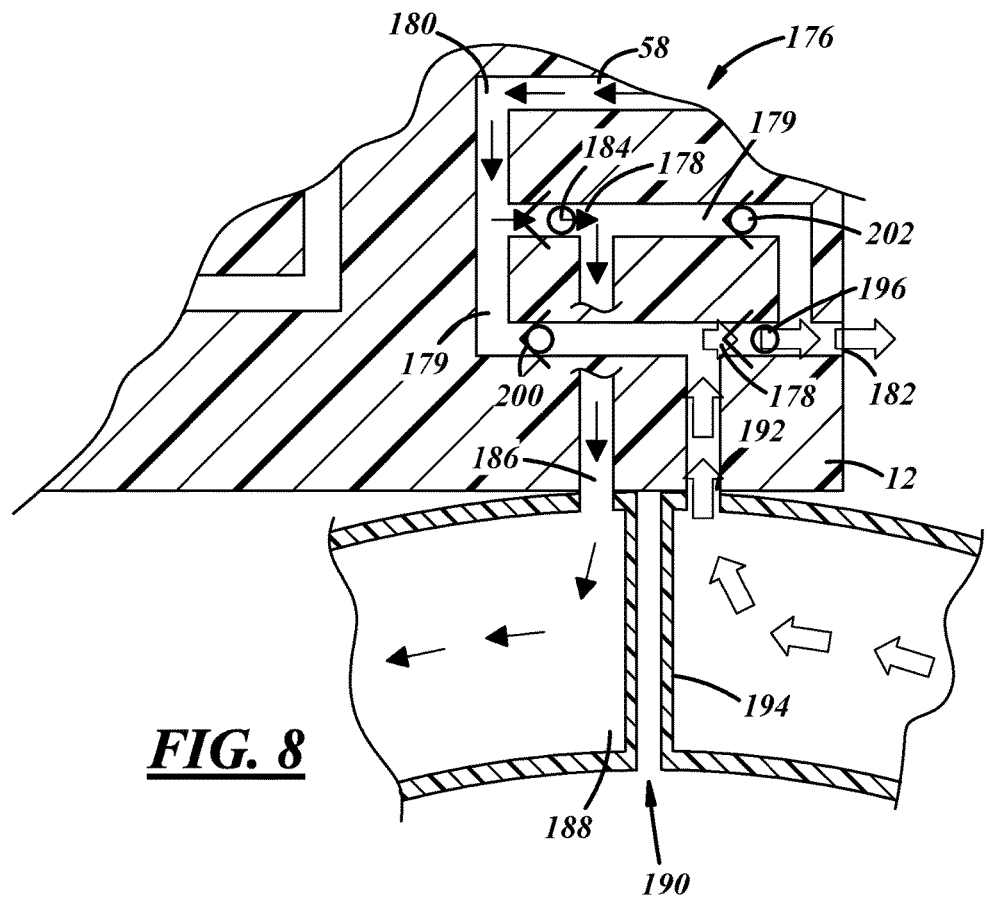
FIG. 8 is a schematic view illustrating a flow path through the bidirectional check valve section incorporated in housing 12.
Figure 9:
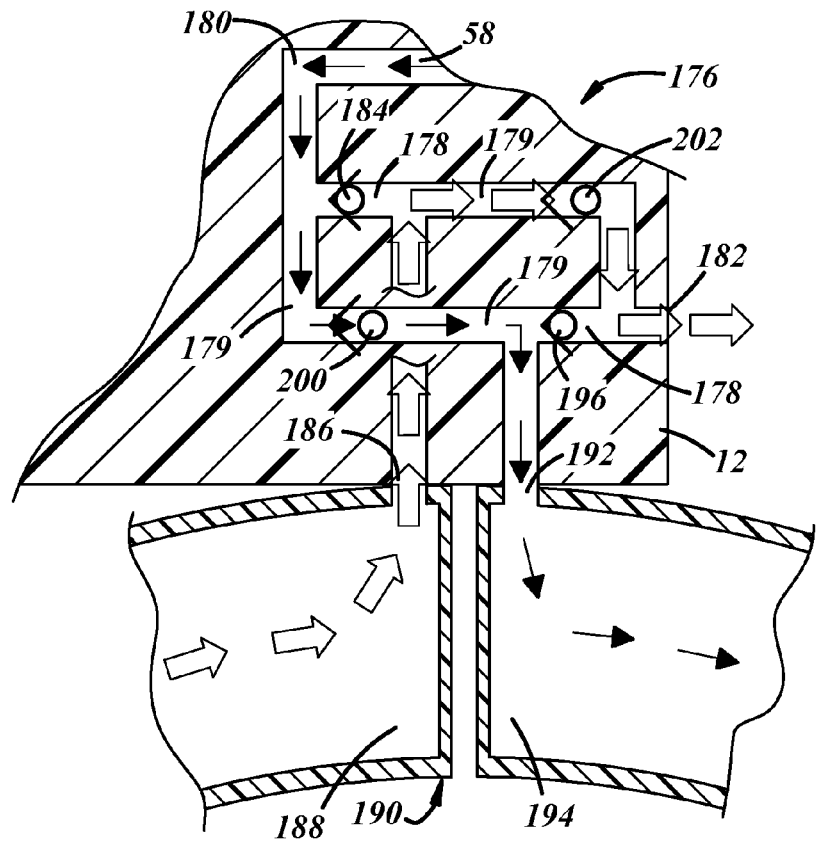
FIG. 9 is a schematic view similar to FIG. 8 illustrating the flow path when the peristaltic pump is working in an opposite direction.

As illustrated in FIGS. 8 and 9, a bi-directional check valve system 176 may be mounted within housing 12 to provide an integral valve regulation system that allows use with a bidirectional or reversible pump. The bidirectional check valve system 176 has outlet passage 58 divided into first and second flow paths 178 and 179 interposed between its upstream end 180 and downstream end 182. In first flow path 178, a pair of check valves 184, 196 allows flow. Upstream check valve 184 is interposed between upstream end 180 and a port 186. A second check valve 196 is interposed between port 192 and downstream end 182 of outlet passage 58. The second flow path 179 has a second pair of check valves 200, 202 that allow flow. Upstream check valve 200 is interposed between upstream end 180 and the port 192. Downstream check valve 202 is interposed between the port 186 and downstream end 182. Port 186 is connected to one end 188 of a peristaltic pump 190. Port 192 is connected to the other end 194 of the peristaltic pump 190.

The peristaltic pump 190 is bi-directional i.e. it is operational when the tire rotates in either direction. The construction of the peristaltic pump is known from other patent literature for example U.S. Pat. No. 8,235,081 and the teachings of U.S. Pat. No. 8,235,081 for a tire and peristaltic pump is hereby incorporated by reference.

Figure 10:
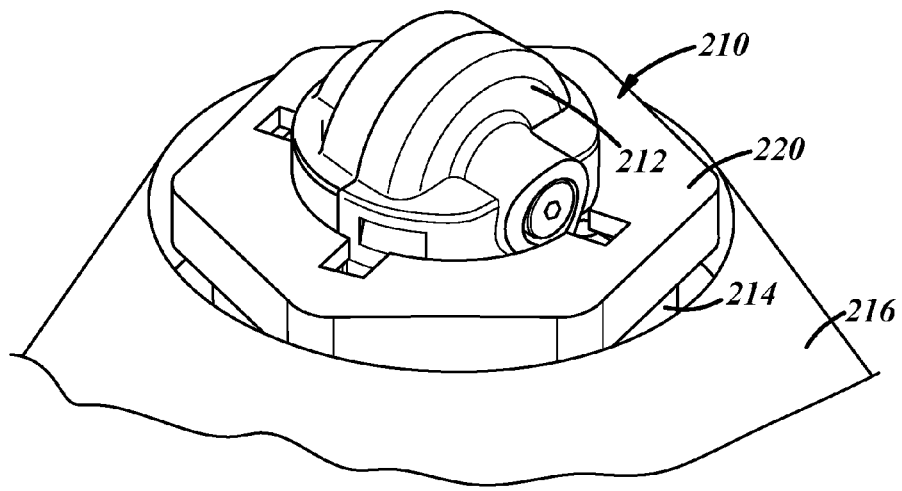
FIG. 10 shows an alternate embodiment of a pressure controlled valve assembly installed in a tire.
Figure 11:
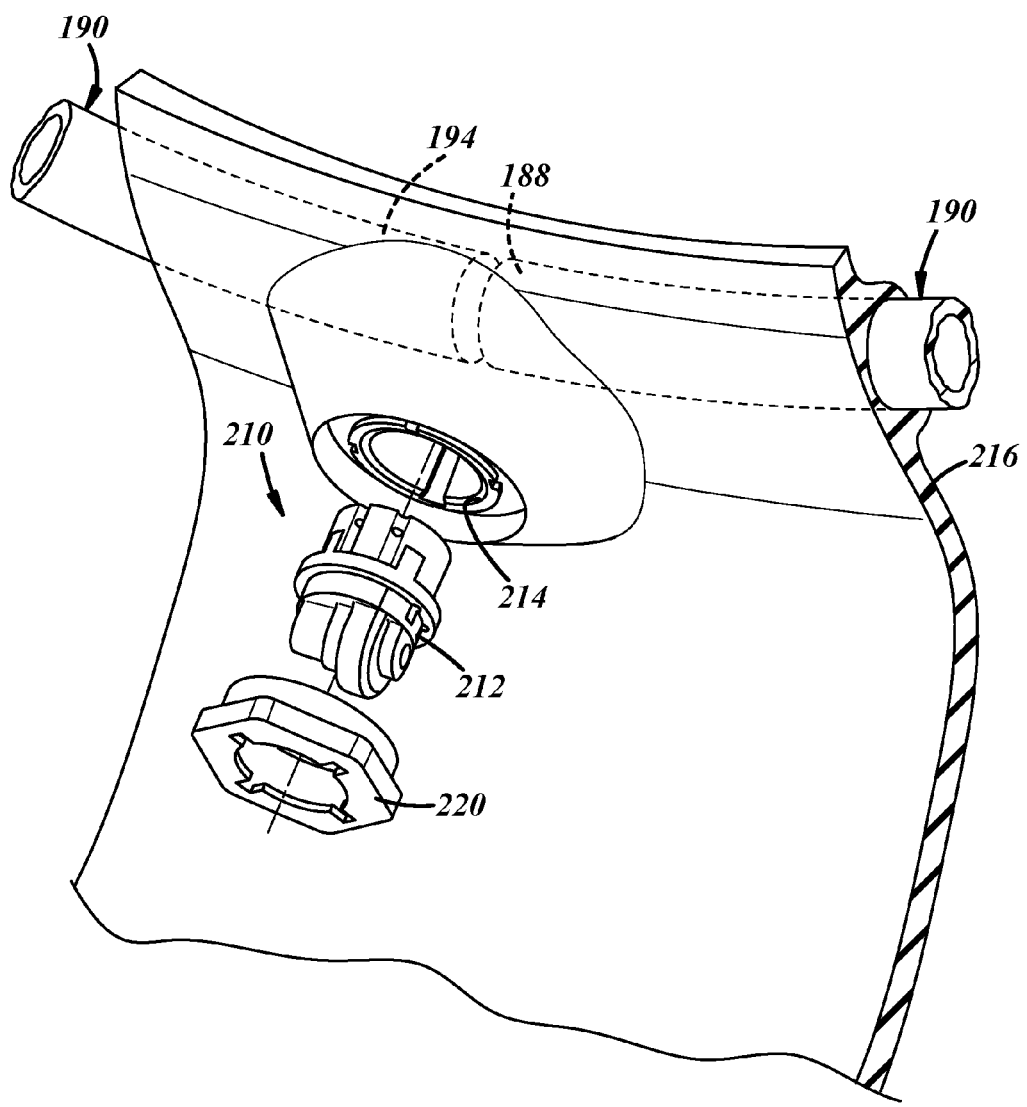
FIG. 11 is a partially exploded view showing the pressure controlled valve being installed in a tire with part of a peristaltic pump shown in the tire.

During operation of the peristaltic pump 190 in one direction as illustrated in FIG. 8, i.e. when the tire is rotating in one direction, the peristaltic pump 190 provides air flow through a first path 178. The high pressure portion of path 178 has air passing through port 192 and through check valve 196 and out past port 182 which leads to an item being pressurized, e.g. the tire 216 as shown in FIGS. 10 and 11. The low pressure side of path 178 has air drawn from the open valve seat (not shown) and through upstream end 180 of passage 58 and through check valve 184. The second pair of check valves 200, 202 is closed and prevents back flow of high pressure air from port 192 and port 182. If the valve 10 is closed, the peristaltic pump 190 is starved of air supply and, while still working, does not effectively pump any air through outlet path 58.

If the peristaltic pump is operating in an opposite direction as illustrated in FIG. 9 i.e. the tire is rotating in an opposite direction, the peristaltic pump provides air flow through second flow path 179. The high pressure portion of path 179 has air passing through port 186 and through check valve 202 and out past port 182 which leads to the item being pressurized, e. g. the tire 216. The low pressure portion of path 179 has air drawn from the open valve and through upstream end 180 of passage 58 and through check valve 200. The first pair of check valves 184, 196 is closed and prevents back flow of high pressure air from port 186 and port 182. If the valve is closed, the peristaltic pump 190 is similarly starved of air supply and, while still working, does not effectively pump any air through outlet path 58.

Figure 12:
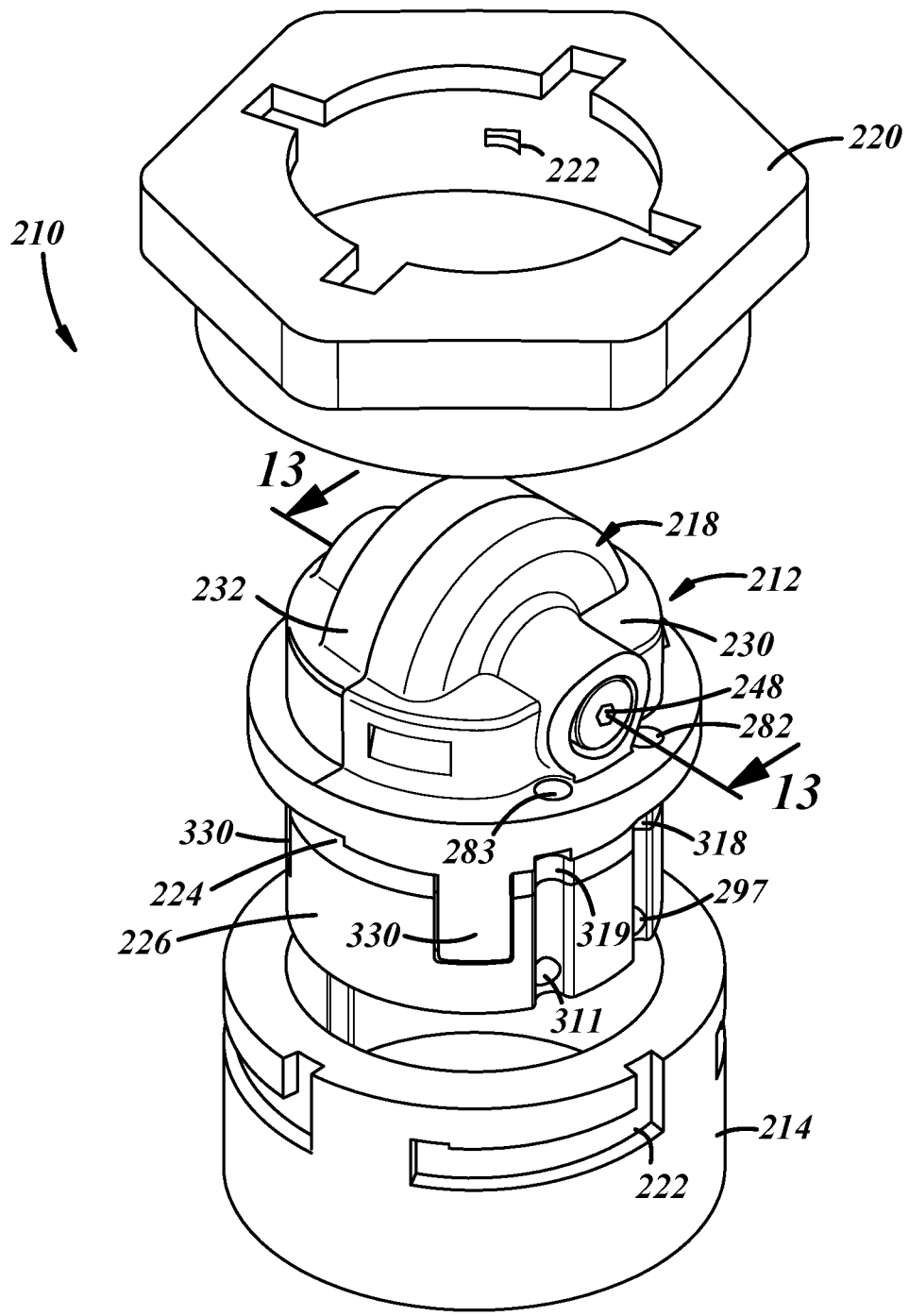
FIG. 12 is an enlarged view of the pressure controlled valve shown in FIG. 11 with the mounting assembly removed from the tire to illustrate a bayonet fitting.

Another alternate embodiment of a bidirectional pressure controlled valve assembly 210 is shown in FIGS. 10-16. Referring now particularly to FIGS. 10-12, the valve assembly 210 has a housing 212 that is installed in an insert 214 permanently mounted to a tire 216 or other inflatable or pressurizable device. A locking ring 220 fits about a valve regulator section 218 of the housing 212 and captures the housing 212 to seat it to insert 214. A bayonet type fitting connection 222 between the locking ring 220 and insert 214 is suitable.

Figure 13:
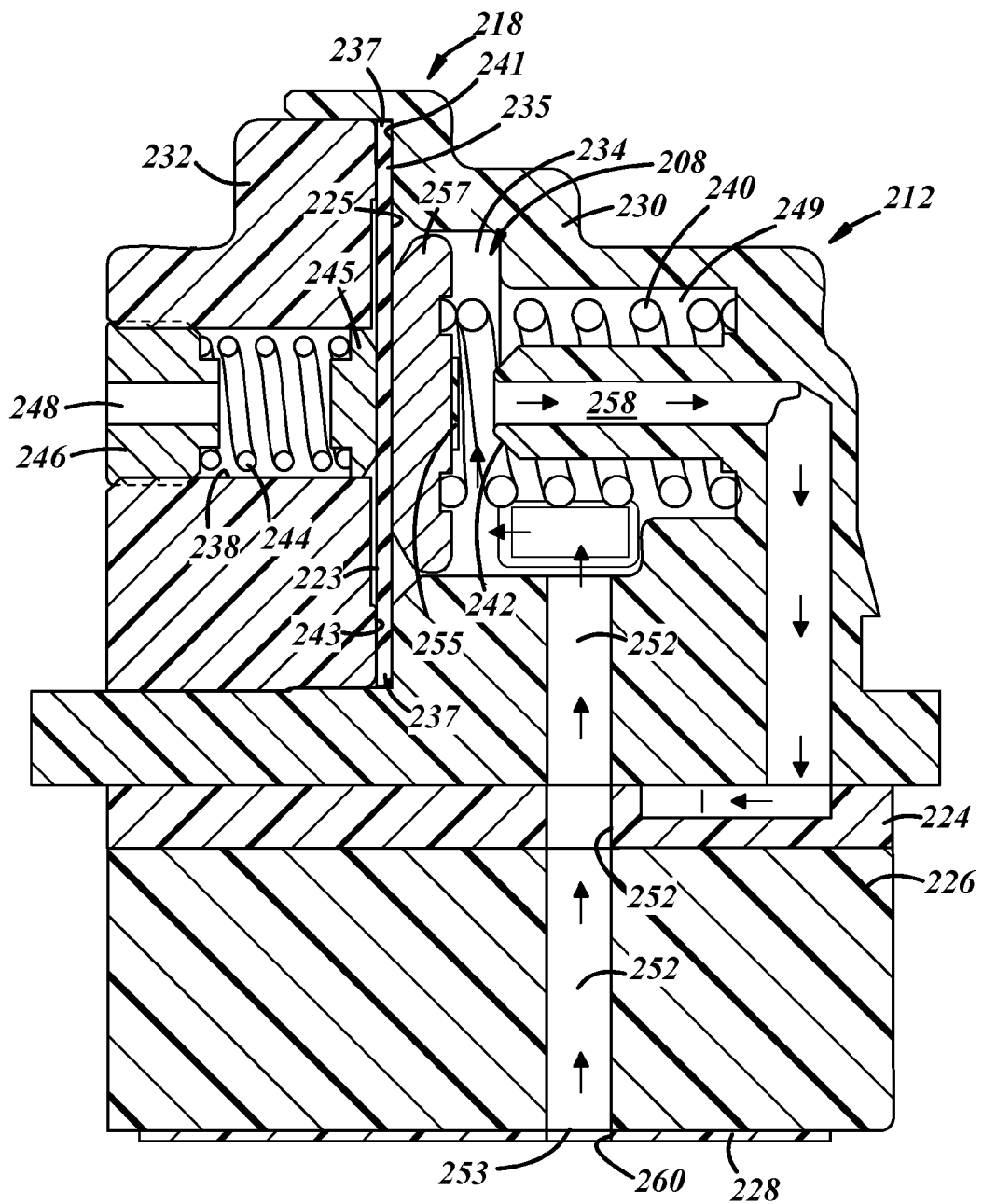
FIG. 13 is a segmented view taken along lines 13-13 shown in FIG. 12.
Figure 14:
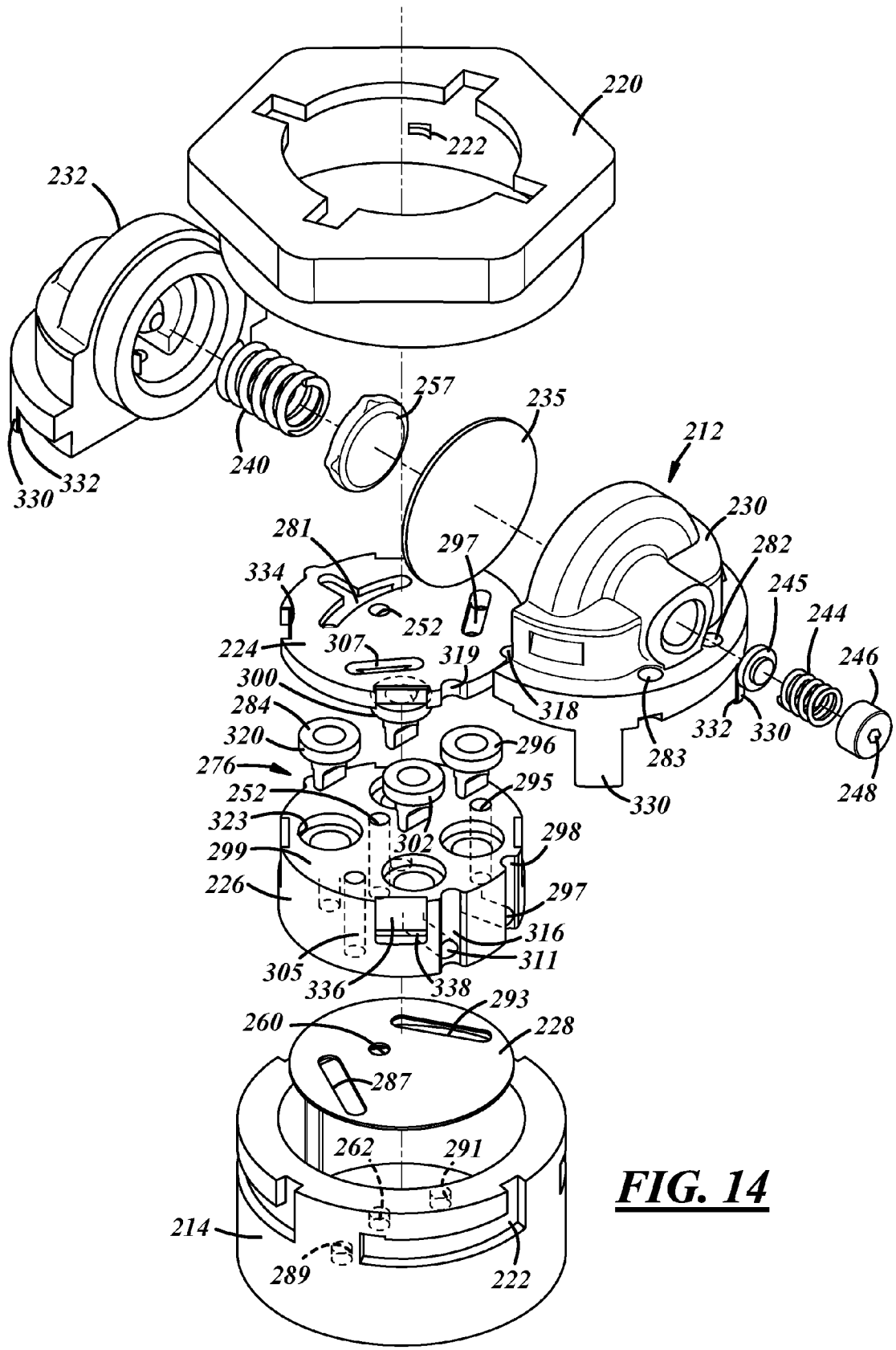
FIG. 14 is an exploded view of the pressure controlled valve shown in FIG. 12.

As most clearly shown in FIGS. 12-14, the housing 212 has a valve regulator section also referred to as a pressure controlled mounting section 218 mounted on a port adapter plate 224 which in turn is mounted on a check valve housing member 226 i.e. second housing section of housing 212. A sealing gasket disc 228 is interposed between the check valve section 226 and the insert 214.

As shown most clearly in FIGS. 13 and 14, the valve regulator section 218 has first and second housing parts 230 and 232 sealingly joined together which houses a valve 208. An inlet port 253 leads to cavity 234 defined in the two joined section 230 and 232 via passage 252. The valve 208 includes a flexible pressure responsive diaphragm 235 is fitted in the cavity 234 and seated or clamped between the joint of the two sections 230 and 232. A resilient first helical spring 240 is seated in cavity 234 to bias the valve 208 to an open position. The valve 208 has a valve pad 255 that seats on a valve seating surface 242 when in the closed position and lifts from the surface 242 when in the open position. The valve pad 255 sits on piston pad 257 which abuts the pressure diaphragm 235.

The valve seating surface 242 surrounds an outlet passage 258. An annular section 249 surrounds the valve seating surface 242 for seating the spring 240. The inlet passage 252 and outlet passage 258, when the valve pad 255 is in the open position as shown in FIG. 13, are in communication with each other.

Inlet 253 leads to passage 252. The passage 252 extends through port adapter plate 224 and check valve housing member 226. The inlet port 253 is in communication with a pneumatic source for example, ambient atmosphere through aperture 260 in port adapter plate 224, sealing gasket disc 228 and through port 262 in insert 214.

As shown in FIG. 13, the diaphragm 235 has a first pressure surface 223 and opposite facing second pressure surface 225 and has its periphery 237 clamped between a shoulder 241 and 243 of housing parts 230 and 232. The housing part 232 has a bore 238 that receives a piston pad 245, second helical spring 244 and a cap 246. The second helical spring 244 is compressed and seated between the cap 246 and piston pad 245. The other side of piston pad 245 presses against the diaphragm 235 through which a closing biasing force is exerted on the valve pad 255 and against the opening biasing force exerted by the first helical spring 240.

The bore 238 with cap 246 and diaphragm valve 235 form a pressure chamber 236. The chamber 236 can be in fluid and pressure communication with a suitable pressure pneumatic control source e.g. interior of tire 216 via a vent 248 through cap 246. The pre-compression, i.e. closing bias of second helical spring 244 is set at a lower force than the opening bias of first helical spring 240. However, when a pre-determined pneumatic pressure e.g. 32 PSI is in pressure control source and thus pressure chamber 236, the combined pneumatic pressure and closing bias of second spring 244 acting on surface 223 of diaphragm 235 is sufficient to overcome the opening bias of first helical spring 240 and valve 208 is moved to the closed position.

The cap member 246 may be affixed within the bore 238 at selected pre-set axial positions such that the spring 244 is pre-compressed a desired amount for a particular application. The affixation may be by a press fit, sonic welding or tight threads. Different housings 212 may be therefore set at different actuation pressures. If regulation at a certain pressure is desired, a valve housing 212 pre-set at a selected actuation pressure is chosen. If a different pressure is then later desired, the valve regulator housing 212 may be swapped with a different valve regulated housing 212 with the cap affixed at a different position. In this fashion, it is foreseen to provide a series of pressured control valves for pressurized and inflatable devices for example tires that can inflate or pressurize to a series of desired pressures. One just picks a particular pressured controlled valve e.g. one set for 32 PSI, 34 PSI or 36 PSI, etc. No other structural differences exist between the valves having different actuation pressures. The only difference is where the cap 246 is axially positioned.

Figure 15:
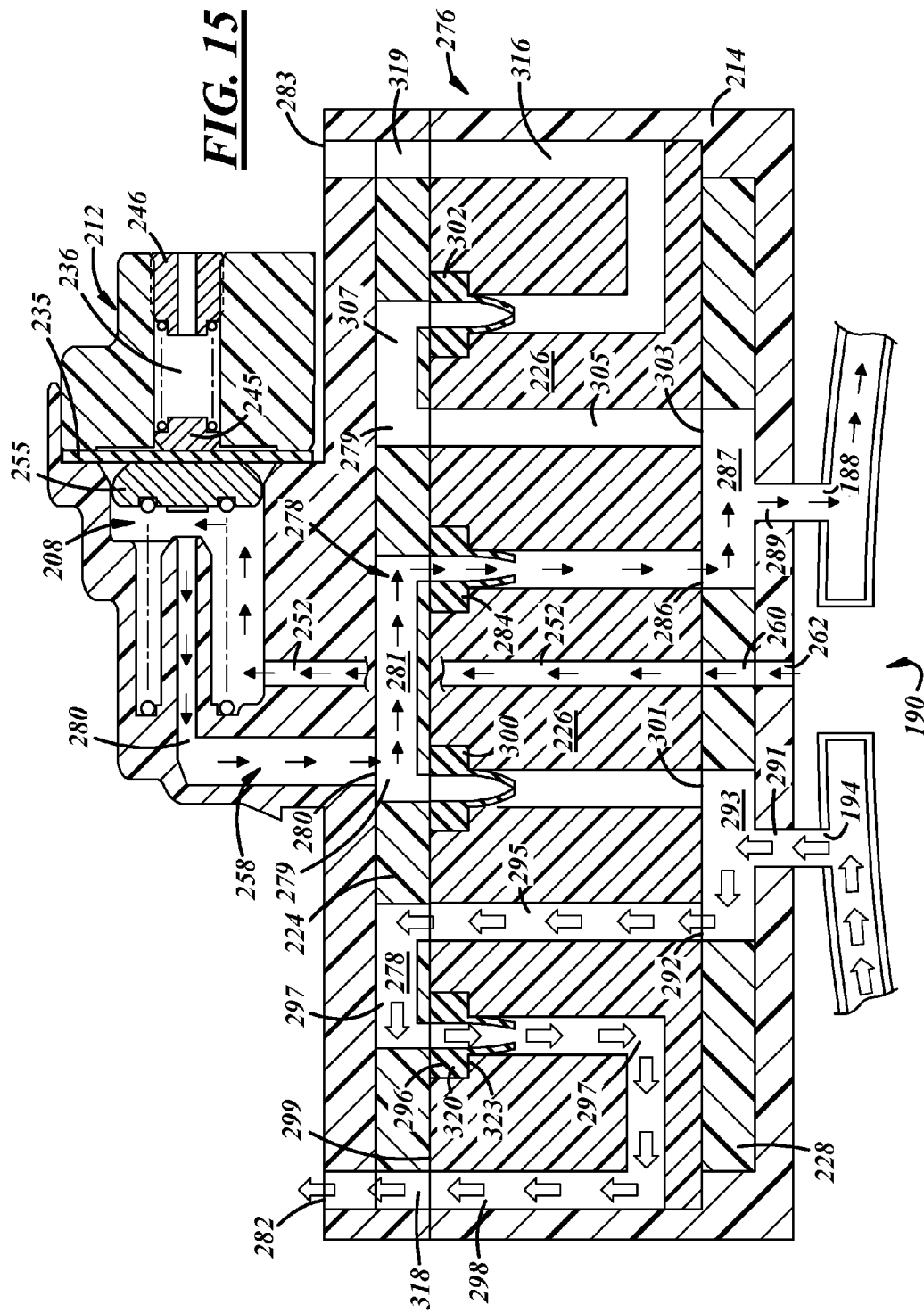
FIG. 15 is a schematic segmented view illustrating the one flow path through the valve assembly shown in FIG. 14 when the peristaltic pump is working in one direction.
Figure 16:
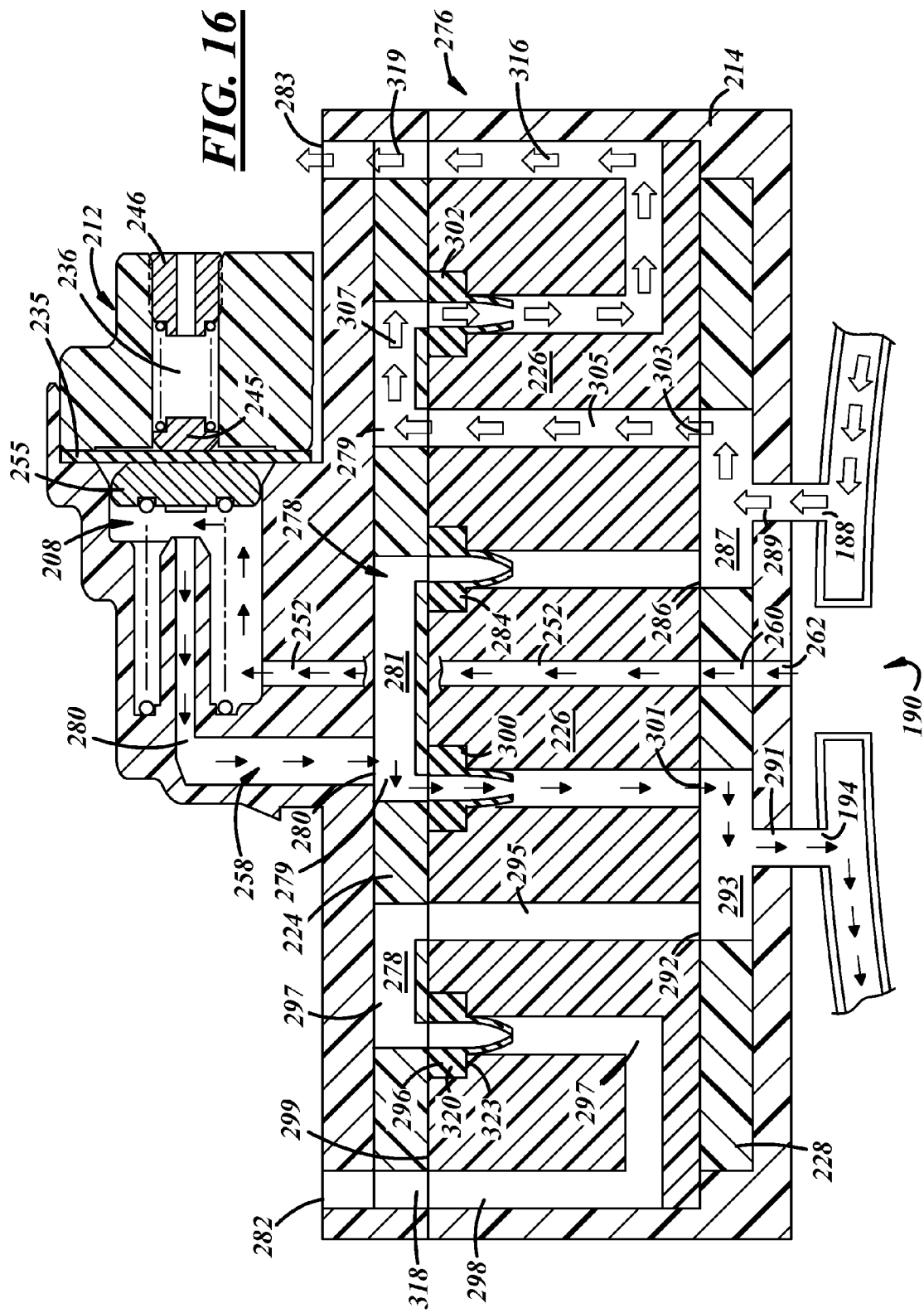
FIG. 16 is a schematic segmented view similar to FIG. 15 illustrating a second flow path through the valve assembly when the peristaltic pump is working in an opposite direction.

In this embodiment, the valve housing 212 has an integrated bi-directional check valve system 276 therein as shown more clearly in FIGS. 14-16. The bidirectional valve system 276 has outlet passage 258 divided into first and second flow paths 278 and 279 beginning in a forked passage 281 in port adapter plate 224 and ending at two downstream ports 282 and 283 in a periphery of valve housing 212. In first flow path 278 as best illustrated in FIG. 15, a first check valve 284 is interposed between upstream end 280 of path outlet passage 258 and a port 286 leading through a passage 287 in gasket 228 and to port 289 in insert 214 leading to one end 188 of peristaltic pump 190. The other end 194 of the peristaltic pump 190 is in communication to a port 291 in insert 214 that leads to passage 293 in gasket 228 in communication with a port 292 of check valve housing member 226. The port 292 leads to passage leg i.e. a third leg 295 that passes through check valve housing member 226 to its top end 299. A valve port passage 297 in valve port adapter 224 communicates to a downstream check valve 296. Passage leg 297 continues downstream and then radially extends out to peripheral groove 298 in valve housing member 226 which leads up to peripheral groove 318 in valve adapter plate 224 that leads up to port 282.

The second flow path 279 as best illustrated in FIG. 16 provides for upstream check valve 300 interposed between upstream end 280 of path outlet passage 258 and a port 301 leading through passage 293 in gasket 228 and to port 291 in insert 214 leading to end 194 of peristaltic pump 190. The other end 188 of the peristaltic pump 190 is in communication to a port 289 in insert 214 that leads to passage 287 in gasket 228 in communication with port 303 of check valve housing member 226. The port 303 leads to passage leg i.e. third leg 305 that passes through check valve housing member 226 to its top end 299. A valve port passage 307 in valve adapter plate 224 communicates to a downstream check valve 302. Passage leg 311 continues downstream and then radially extends out to second peripheral groove 316 in valve housing member 226 which leads up to peripheral groove 319 in valve adapter plate 224 that leads up to port 283.

All four check valves 284, 296, 300 and 302 are duck billed types with peripheral mounting rims 320 that are seated in counterbores 323 in the top end 299 of the check valve housing member 226. The port adapter plate 224 sealingly seats on the mounting rims 320 and presses them down till it is seated against the top end 299.

The check valves act in pairs with check valves 284 and 296 opening and closing together and check valves 300 and 302 opening and closing together, but each pair being completely out of phase with the other pair. During operation of the peristaltic pump in one direction as i.e. rotation of the tire in one direction, the peristaltic pump 190 delivers high air pressure through port 292, illustrated in FIG. 15, and through check valve 296 in first flow path 278. Air is drawn from the valve 208 and through upstream end 280 of passage 258 through check valve 284 and down to the end 188 of peristaltic pump 190. The pair of check valves 300 and 302 are closed and prevent back flow of high pressure from ports 301 and 283. If the valve 208 is closed, the peristaltic pump 190 is starved of air supply and while still undergoing peristaltic action, does not effectively pump any air to port 282.

If the peristaltic pump 190 is rotated in an opposite direction, the peristaltic pump 190 delivers high air pressure to port 303 and through check valve 302 illustrated in FIG. 16 in second flow path 279. Air is drawn from the open valve 208 and through upstream end 280, through check valve 300, and down to end 194 of peristaltic pump 190. The pair of check valves 284 and 296 is closed and prevents the back flow of high pressure from ports 286 and 282. If the valve 208 is closed, the peristaltic pump 190 is similarly starved of air supply and, while still undergoing peristaltic action, does not effectively pump any air to port 283.

The valve regulator housing section 218, port adapter plate 224 and check valve housing member 226 are assembled together by a snap fit, ultrasonic weld, or press fit connection. A plurality of tabs 330 downwardly extends from the housing sections 230 and 232. The tabs have an inwardly extending protrusion 332. The port adapter plate 224 has three peripheral notches 334 and the check valve housing member 226 has peripheral notch sections 336 to receive the tabs 330. Furthermore, each notch section 336 has an undercut end 338 to receive the protrusion 332. In this fashion, the housing is easily assembled and secured.

In certain applications, the cap member 246 may be adjustably mounted on threads. The aperture 248 may be shaped to receive an Allen wrench or other driving tool to rotate the cap member 246 on the threads to rotate it and axially move it along bore 238. The second helical spring 244 has its pre-compression adjusted as the cap member 248 threadably advances or retreats. In this manner, the valve assembly 210 may have its actuation pressure and regulation pressure adjusted a desired amount for different applications.

Other variations and modifications are possible without departing from the scope and spirit of the present invention as defined by the appended claims.

The embodiments in which an exclusive property or privilege is claimed are defined as follows:

1. A pressure controlled valve assembly comprising:
   a housing having a pressure controlled valve housed therein that is controlled between an open position and closed position by a pressure control chamber in said housing for controlling communication of a pneumatic supply source through an inlet and a pneumatic pressure control source through an outlet;
   said pneumatic pressure control source being in communication with a pressurizable device to provide feedback through the pressure control chamber to control pressure in said pressurizable device;
   said housing having a first passageway and a second passageway interposed between said pressure controlled valve and said outlet;
   said first passageway and said second passageway having a respective first and second port in said housing connectable to a respective first end and second end of a reversible pump;
   a first pair of check valves in said first passageway of said housing and a second pair of check valves in said second passageway of said housing; and
   one check valve that is downstream of each first and second pair enables high pressure from said reversible pump to flow through a respective port to said outlet and the other check valve that is upstream of each first and second pair enables low pressure flow from said pressure controlled valve to said reversible pump when said reversible pump operates in either respective direction and said pressure controlled valve is in the open position.

2. A pressure controlled valve assembly as defined in claim 1 further comprising:
said housing having a pressure controlled valve mounting section and a second housing section;
said second housing section having first and second ends with two path legs of said first and second passageways passing through said second housing section from said first end to said second end;
said first end being mounted to said pressure controlled valve housing section; and
said first pair and second pair of check valves being positioned at respective first ends of said two path legs of said first and second passageways.

3. A pressure controlled valve assembly as defined in claim 2 further comprising:
said check valves each having a mounting rim seated in a respective counterbore at respective first ends of said two path legs of each said first and second passageways.

4. A pressure controlled valve assembly as defined in claim 3 further comprising:
said first and second pair of check valves being duck bill type check valves.

5. A pressure controlled valve assembly as defined in claim 4 further comprising:
a port adapter plate interposed between said pressure controlled valve mounting section and said second housing section; and
said mounting rims of said check valve having ends sealingly abutting said port adapter plate for directing flow from said port adapter plate and through said second housing section.

6. A pressure controlled valve assembly as defined in claim 2 further comprising:
said second housing section having a third leg in each passageway for providing return flow from said reversible pump to the first end of said second housing section and selectively providing high pressure flow through one of said downstream check valves.

7. A pressure controlled valve assembly as defined in claim 2 further comprising:
said second housing section having said inlet passing therethough to said pressure controlled valve mounting section.

8. A pressure controlled valve assembly as defined in claim 2 further comprising:
a port adapter plate interposed between said pressure controlled valve mounting section and said second housing section; and
said mounting rims of said check valve having ends sealingly abutting said port adapter plate for directing flow from said port adapter plate and through said second housing section.

9. An adjustable pressure controlled valve comprising:
a housing with a cavity therein;
an inlet passage leading to said cavity and an outlet passage leading from said cavity in said housing;
said housing having a valve seat interposed between said inlet passage and outlet passage;
a valve member mounted in said cavity and operably interposed between said inlet passage and said outlet passage of said housing, said valve member having a valve surface for seating on said valve seat when in a closed position and movable from said valve seat to an open position;
a first resilient biasing member mounted in said housing for exerting an opening bias force on said valve member to move said valve member to said open position;
a second resilient biasing member mounted on an opposite side of said valve member for exerting a closing bias force on said valve member to move said valve member to said closed position;
said closing bias force of said second resilient biasing member being less than said opening bias force of said first resilient biasing member;
a cap member being inserted in said bore a pre-set axial amount to seat and pre-compress said second resilient biasing member a pre-set amount between said cap member and said valve member and affixing said cap member in place such that said closing bias force of said second resilient biasing member is adjustably pre-set by said cap member; and
said valve member being biased to the closed position by a pneumatic pressure control source and when pneumatic pressure in said pneumatic pressure control source is over a pre-determined amount, its closing bias force in addition to the closing bias force of the second resilient biasing member overcomes the opening bias force of said first resilient biasing member to close said valve member; said housing having a first passageway and a second passageway interposed between said valve seat and said outlet; said first passageway and said second passageway having a respective first and second port in said housing connectable to a respective first end and second end of a reversible pump; and a first and second pair of check valves in said first passage and a second pair of check valves in said second passage of said housing, one check valve that is downstream of each first and second pair enables high pressure flow from said reversible pump to and through a respective port to said outlet and the other check valve that is upstream of each first and second pair enables lower pressure flow from said valve member to said reversible pump when said reversible pump operates in either respective direction and said valve member is in the open position.

10. A pressure controlled valve assembly as defined in claim 9 further comprising:
said housing having a pressure controlled valve mounting section and a second housing section;
said second housing section having first and second ends with two path legs of each of said first and second passageways passing through said second housing section from said first end to said second end;
said first end being mounted to said pressure controlled valve housing section; and
said first pair and second pair of check valves being positioned at said respective first ends of said two path legs of each of said first and second passageways.

11. A pressure controlled valve assembly as defined in claim 10 further comprising:
said check valves each having a mounting rim seated in a respective counterbore at respective first ends of said first and second path legs of each of said first and second passageways.

12. A pressure controlled valve assembly as defined in claim 11 further comprising:
said first and second pair of check valves being duck bill type check valves.

13. A pressure controlled valve assembly as defined in claim 10 further comprising:

said second housing section having a third leg and in each passageway for providing return flow from said reversible pump to the first end of said second housing section and selectively providing high pressure flow through one of said downstream check valves.

14. A pressure controlled valve assembly as defined in claim 10 further comprising:
said second housing section having said inlet passing therethough to said pressure controlled valve mounting section.

15. A pressure controlled valve assembly as defined in claim 14 further comprising:
a port adapter plate interposed between said pressure controlled valve mounting section and said second housing section; and
said mounting rims of said check valve having ends sealingly abutting said port adapter plate for directing flow from said port adapter plate and through said second housing section.

16. A pressure controlled valve assembly as defined in claim 9 further comprising:
a port adapter plate interposed between said pressure controlled valve mounting section and said second housing section; and
said mounting rims of said check valve having ends sealingly abutting said port adapter plate for directing flow from said port adapter plate and through said second housing section.

* * * * *